United States Patent
Nitta et al.

(10) Patent No.: US 7,391,189 B2
(45) Date of Patent: Jun. 24, 2008

(54) STEP-UP/DOWN DC-DC CONVERTER

(75) Inventors: Shohichi Nitta, Osaka (JP); Masahiro Matsuo, Hyogo (JP); Ritsuko Nomura, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 187 days.

(21) Appl. No.: 10/554,404

(22) PCT Filed: Apr. 22, 2004

(86) PCT No.: PCT/JP2004/005756

§ 371 (c)(1),
(2), (4) Date: Oct. 24, 2005

(87) PCT Pub. No.: WO2004/098034

PCT Pub. Date: Nov. 11, 2004

(65) Prior Publication Data

US 2006/0208718 A1    Sep. 21, 2006

(30) Foreign Application Priority Data

Apr. 28, 2003  (JP) .............................. 2003-123820

(51) Int. Cl.
*G05F 1/62*   (2006.01)
*G05F 1/618*  (2006.01)
(52) U.S. Cl. .................... 323/259; 323/271; 323/284
(58) Field of Classification Search ................ 323/225, 323/259, 268, 271, 282, 284, 344, 351
See application file for complete search history.

(56) References Cited

U.S. PATENT DOCUMENTS

| 5,914,591 | A  |   | 6/1999  | Yasuda |         |
|-----------|----|---|---------|--------|---------|
| 6,166,527 | A  | * | 12/2000 | Dwelley et al. | 323/222 |
| 7,202,644 | B2 | * | 4/2007  | Nitta et al.   | 323/259 |

FOREIGN PATENT DOCUMENTS

| EP | 1 146 629 A2 | 10/2001 |
|----|--------------|---------|
| JP | 05-275985    | 10/1993 |
| JP | 2000-166223  | 6/2000  |
| JP | 2001-086740  | 3/2001  |
| JP | 2003-070247  | 3/2003  |

* cited by examiner

*Primary Examiner*—Gary L Laxton
(74) *Attorney, Agent, or Firm*—Dickstein Shapiro LLP

(57) ABSTRACT

A step-up/down DC-DC converter is disclosed that includes: a step-up/down part generating an output voltage by stepping up or down an input voltage; and a control part generating an error signal indicating an error between a voltage value obtained by dividing the output voltage and a predetermined reference voltage, and causing the step-up/down part to perform a step-up or step-down operation based on the comparison between the error signal and first and second triangle wave signals. The control part includes a first circuit generating the first triangle wave signal for step-down control and a second circuit generating the second triangle wave signal for step-up control. The first circuit generates a clock signal synchronized with the first triangle wave signal, and outputs the clock signal to the second circuit. The second circuit generates the second triangle wave signal synchronized with the first triangle wave signal based on the input clock signal.

8 Claims, 6 Drawing Sheets

STEP-UP/DOWN DC-DC CONVERTER

TECHNICAL FIELD

The present invention relates generally to step-up/down DC-DC converters, and more particularly to a step-up/down DC-DC converter including a triangle wave generator part used for PWM (pulse width modulation) control.

BACKGROUND ART

In recent years, small-size portable apparatuses such as cellular phones have been widely used. Such small-size portable apparatuses employ small-size rechargeable (secondary) batteries as power supply. In order to make batteries smaller in size and usable for as long a period as possible, attempts have been made to improve battery performance and make apparatuses consume less power. It is desirable to widen the usable voltage range of batteries as much as possible to reduce batteries in volume and make them usable for a longer period of time. Accordingly, a step-up/down DC-DC converter, which can supply constant voltage to a load even when battery voltage becomes lower than a voltage required by the load, is employed as a power supply circuit. Japanese Laid-Open Patent Application No. 2000-166223 discloses such a step-up/down DC-DC converter. The step-up/down DC-DC converter, which is not selective in supply voltage, has the merit of being able to support a variety of input power sources such as batteries and AC adapters.

FIG. 1 is a circuit diagram showing a conventional step-up/down DC-DC converter 100.

The step-up/down DC-DC converter 100 includes an input terminal IN to which an upstream voltage Vin is input, an output terminal OUT from which a predetermined downstream voltage Vout is output, a PWM control part 101, and a voltage step-up/down part 102.

A comparator CMP13 compares a division voltage Vx generated by dividing the downstream voltage Vout by resistors Ra and Rb with a reference voltage Vref. Then, the comparator CMP13 generates an error signal from the comparison result, and outputs the error signal to a step-up-side comparator CMP12 and a step-down-side comparator CMP11.

A current supplied from a current source i11 and an external clock signal CLKe are input to each of a level shift circuit 111 and a sawtooth wave generator circuit 112. A shift by the level shift circuit 111 and the peak value of a sawtooth wave generated by the sawtooth wave generator circuit 112 have relative dependency. That is, even if the current supplied from the current source i11 varies, sawtooth waves in the level shift circuit 111 and the sawtooth wave generator circuit 112 vary while maintaining their relationship of the parallel translation of the same waveform. Accordingly, the sawtooth waves are unaffected by variations in the current supplied from the current source i11.

The sawtooth wave generator circuit 112 provides a sawtooth wave to the step-down-side comparator CMP11 as a step-down-side sawtooth wave. The sawtooth wave is also provided to the level shift circuit 111. The level shift circuit 111 shifts up the provided sawtooth wave by a predetermined voltage, and provides the shifted-up sawtooth wave to the step-up-side comparator CMP12 as a step-up-side sawtooth wave. The step-down-side and step-up-side comparators CMP11 and CMP12 compare their respective input sawtooth waves with the input error signal. For instance, if the error signal falls within a step-down-mode shift voltage range in the step-down-side sawtooth wave, the step-down-side comparator CMP11 outputs to a DC-DC converter control circuit 113 a mode switch signal Ddn to cause a step-down circuit to operate.

If the error signal falls within a step-up-mode shift voltage range in the step-up-side sawtooth wave, the step-up-side comparator CMP12 outputs to the DC-DC converter control circuit 113 a mode switch signal Dup to cause a step-up circuit to operate.

If the error signal falls within both the step-down-mode and step-up-mode shift voltage ranges, the step-down-side and step-up-side comparators CMP11 and CMP12 output the mode switch signal Ddn and Dup, respectively, to the DC-DC converter control circuit 113.

The DC-DC converter control circuit 113 generates a switching signal in response to the input mode switch signal Ddn and/or the input mode switch signal Dup, and outputs the generated switching signal to a predriver 114. The predriver 114 outputs the switching signal to the voltage step-up/down part 102 so as to perform step-up/down control of the downstream voltage Vout.

However, the conventional step-up/down DC-DC converter 100 requires the external clock signal CLKe to generate a sawtooth wave, and employs the level shift circuit 111 to generate a sawtooth wave for stepping up voltage. Thus, the conventional step-up/down DC-DC converter 100 requires an additional clock circuit and the level shift circuit 111. As a result, the circuit is increased in scale and complicated, which causes an increase in circuit space and cost.

DISCLOSURE OF THE INVENTION

Accordingly, it is a general object of the present invention to provide a step-up/down DC-DC converter in which the above-described disadvantages are eliminated.

A more specific object of the present invention is to provide a step-up/down DC-DC converter that dispenses with an external clock signal, and can generate two triangle waves of different levels with a simple circuit.

The above objects of the present invention are achieved by a step-up/down DC-DC converter, including: a voltage step-up/down part configured to generate and output a predetermined output voltage by stepping up or down an input voltage in accordance with a control signal input to the voltage step-up/down part; and a control part configured to generate an error signal indicating an error between a voltage value obtained by dividing the output voltage and a predetermined reference voltage, compare the error signal and first and second triangle wave signals, and cause the voltage step-up/down part to perform a step-up or step-down operation based on a result of the comparison, wherein the control part includes: a first triangle wave generator circuit configured to generate the first triangle wave signal compared with the error signal to determine whether to cause the voltage step-up/down part to perform the step-down operation; and a second triangle wave generator circuit configured to generate the second triangle wave signal compared with the error signal to determine whether to cause the voltage step-up/down part to perform the step-up operation, the first triangle wave generator circuit being configured to generate a clock signal synchronized with the generated first triangle wave signal, and output the generated clock signal to the second triangle wave generator circuit, the second triangle wave generator circuit being configured to generate the second triangle wave signal synchronized with the first triangle wave signal based on the input clock signal, and output the second triangle wave signal.

The above objects of the present invention are also achieved by a step-up/down DC-DC converter, including: a voltage step-up/down part configured to generate and output a predetermined output voltage by stepping up or down an input voltage in accordance with a control signal input to the voltage step-up/down part; and a control part configured to generate an error signal indicating an error between a voltage value obtained by dividing the output voltage and a predetermined reference voltage, compare the error signal and first and second triangle wave signals, and cause the voltage step-up/down part to perform a step-up or step-down operation based on a result of the comparison, wherein the control part includes: a first triangle wave generator circuit configured to generate the first triangle wave signal compared with the error signal to determine whether to cause the voltage step-up/down part to perform the step-down operation; and a second triangle wave generator circuit configured to generate the second triangle wave signal compared with the error signal to determine whether to cause the voltage step-up/down part to perform the step-up operation, the second triangle wave generator circuit being configured to generate a clock signal synchronized with the generated second triangle wave signal, and output the generated clock signal to the first triangle wave generator circuit, the first triangle wave generator circuit being configured to generate the first triangle wave signal synchronized with the second triangle wave signal based on the input clock signal, and output the first triangle wave signal.

According to the step-up/down DC-DC converter of the present invention, a clock signal for synchronizing a first triangle wave signal for step-down control of an output voltage and a second triangle wave signal for step-up control of the output voltage may be generated in one of first and second triangle wave generator circuits to be employed in generating the triangle wave signal in the other one of the first and second triangle wave generator circuits. This eliminates the necessity of providing an additional circuit for generating the clock signal, thus realizing circuit simplification and cost reduction.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description is given below, with reference to the accompanying drawings, of an embodiment of the present invention.

Figure 1:
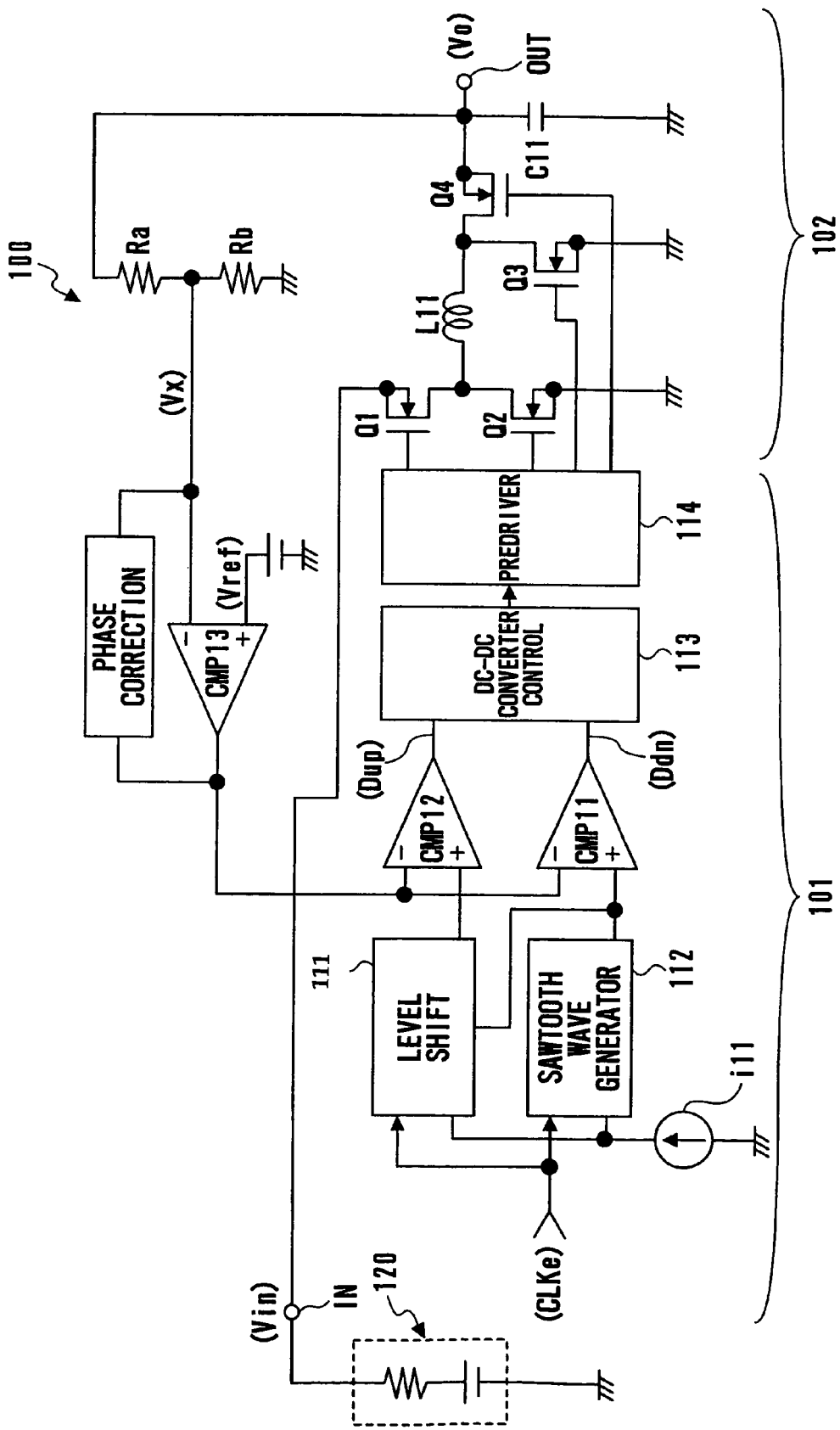
FIG. 1 is a circuit diagram showing a conventional step-up/down DC-DC converter.
Figure 2:
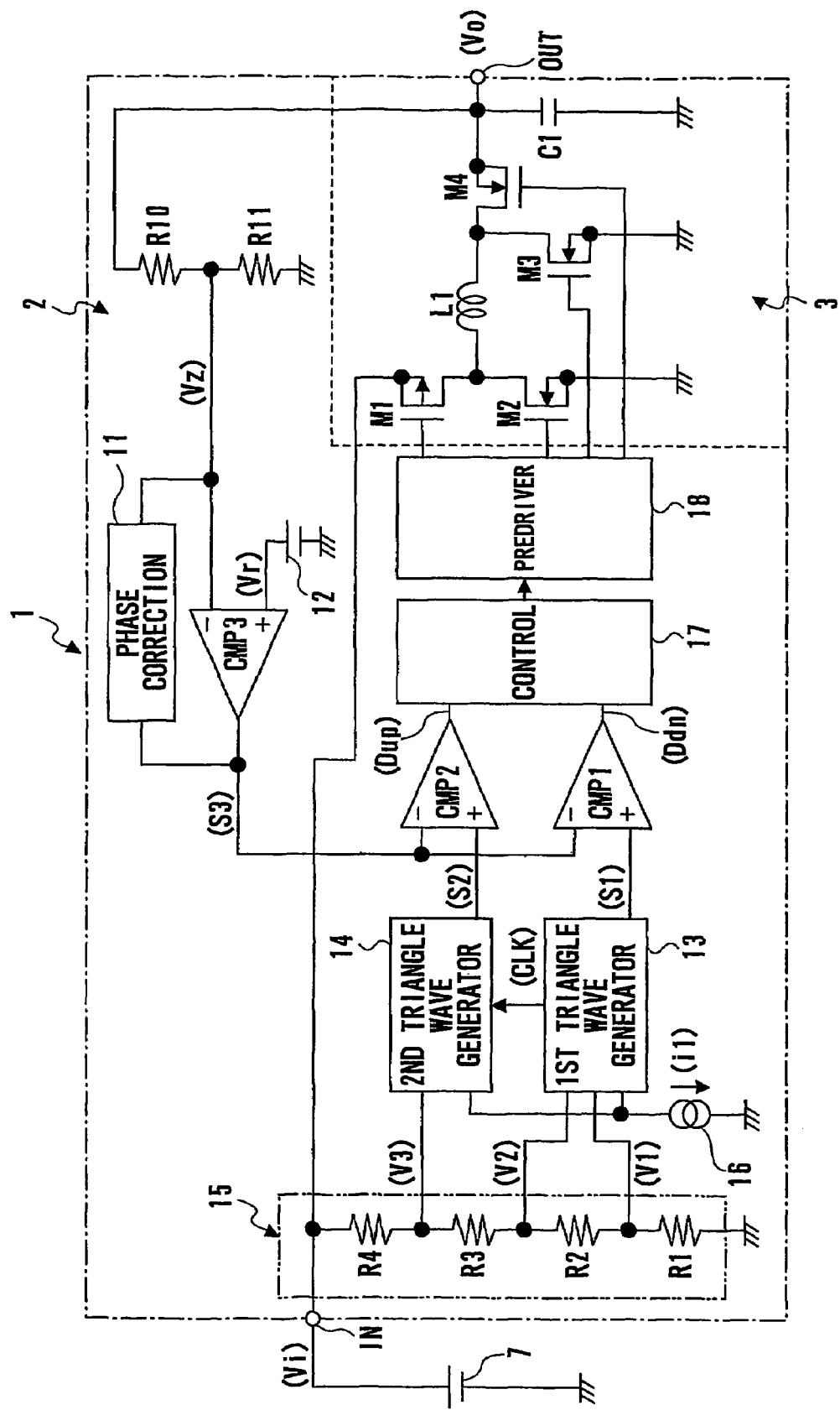
FIG. 2 is a circuit diagram showing a step-up/down DC-DC converter according to an embodiment of the present invention.

FIG. 2 is a circuit diagram showing a step-up/down DC-DC converter 1 according to the embodiment of the present invention. The step-up/down DC-DC converter 1 includes an input terminal IN to which an input voltage Vi is input from an external power supply 7, an output terminal OUT from which a predetermined output voltage Vo is output, a PWM control part 2 generating and outputting a pulse signal in accordance with the voltage value of the output voltage Vo, and a voltage step-up/down part 3 performing switching in accordance with the pulse signal provided from the PWM control part 2 so as to step up and step down the output voltage Vo.

The PWM control part 2 includes a phase correction circuit 11, a step-down-side comparator CMP1, a step-up-side comparator CMP2, a comparator CMP3, resistors R10 and R11 generating and outputting a division voltage Vz by dividing the output voltage Vo, a reference voltage generator circuit 12 generating and outputting a predetermined reference voltage Vr, a first triangle wave generator circuit 13 generating and outputting a first triangle wave signal S1, a second triangle wave generator circuit 14 generating and outputting a second triangle wave signal S2, a voltage setting circuit 15 setting the upper limit voltage and the lower limit voltage of the first triangle wave signal S1 and the upper limit voltage of the second triangle wave signal S2, a current source 16 supplying a current i1 for setting the slope of voltage variation of each of the first and second triangle wave signals S1 and S2, a control circuit 17, and a predriver 18.

The voltage step-up/down part 3 includes a PMOS transistor M1 performing step-down control on the input voltage Vi, an NMOS transistor M2 performing synchronous rectification at the time of the step-down control, an NMOS transistor M3 performing step-up control on the input voltage Vi, an NMOS transistor M4 performing synchronous rectification at the time of the step-up control, an inductor L1, and a capacitor C1.

The voltage setting circuit 15 includes resistors R1, R2, R3, and R4 connected in series between the input terminal IN and ground. A voltage V1 at the connection of the resistors R1 and R2 and a voltage V2 at the connection of the resistors R2 and R3 are input to the first triangle wave generator circuit 13. A voltage V3 at the connection of the resistors R3 and R4 is input to the second triangle wave generator circuit 14. The current i1 supplied from the current source 16 is input to the first and second triangle wave generator circuits 13 and 14. The voltages V1, V2, and V3 form a first voltage Va, a second voltage Vb, and a third voltage Vc, respectively.

The first triangle wave generator circuit 13 generates the first triangle wave signal S1 from the input voltages V1 and V2 and current i1, and outputs the first triangle wave signal S1 to the non-inverting input terminal of the step-down-side comparator CMP1. Further, the first triangle wave generator circuit 13 generates a clock signal CLK synchronizing with the first triangle wave signal S1, and outputs the clock signal CLK to the second triangle wave generator circuit 14. Specifically, the first triangle wave generator circuit 13 sets the lower limit voltage of the first triangle wave signal S1 from the voltage V1 and the upper limit voltage of the first triangle wave signal S1 from the voltage V2. Further, the first triangle wave generator circuit 13 sets the slope of voltage variation of the first triangle wave signal S1 from the current i1.

The second triangle wave generator circuit 14 generates the second triangle wave signal S2 from the input voltage V3, current i1, and clock signal CLK, and outputs the second triangle wave signal S2 to the non-inverting input terminal of the step-up-side comparator CMP2. Specifically, the second triangle wave generator circuit 14 sets the upper limit voltage of the second triangle wave signal S2 from the voltage V3, and sets the slope of voltage variation of the second triangle wave signal S2 from the current i1. Further, the second triangle wave generator circuit 14 sets the lower limit voltage of the second triangle wave signal S2 from the clock signal CLK, and synchronizes the second triangle wave signal S2 with the first triangle wave signal S1.

The resistors R10 and R11 are connected in series between the output voltage Vo and ground. The connection of the resistors R10 and R11 is connected to the inverting input terminal of the comparator CMP3. The division voltage Vz generated by the resistors R10 and R11 is input to the inverting input terminal of the comparator CMP3, and the reference voltage Vr supplied from the reference voltage generator circuit 12 is input to the non-inverting input terminal of the comparator CMP3. Further, the output terminal of the comparator CMP3 is connected to the inverting input terminal of each of the step-down-side comparator CMP1 and the step-up-side comparator CMP2. The phase correction circuit 11 is connected between the output terminal and the inverting input terminal of the comparator CMP3. The comparator CMP3 compares the division voltage Vz and the reference voltage Vr, and generates an error signal S3 based on the comparison result. Then, the comparator CMP3 outputs the error signal S3 to the inverting input terminal of each of the step-down-side comparator CMP1 and the step-up-side comparator CMP2. The phase correction circuit 11, which is provided in a feedback loop from the circuit outputting the output voltage Vo, corrects a phase difference.

The output terminal of each of the step-down-side comparator CMP1 and the step-up-side comparator CMP2 is connected to the control circuit 17. The output terminal of the control circuit 17 is connected to the predriver 18. The predriver 18 is connected to the gate of each of the PMOS transistor M1 and the NMOS transistors M2 through M4, and controls the operation of each of the PMOS transistor M1 and the NMOS transistors M2 through M4. The PMOS transistor M1 and the NMOS transistor M2 are connected in series between the input terminal IN and ground.

The inductor L1 and the NMOS transistor M4 are connected in series between the connection of the PMOS transistor M1 and the NMOS transistor M2 and the output terminal OUT. The NMOS transistor M3 is connected between the connection of the inductor L1 and the NMOS transistor M4 and ground. The capacitor C1 is connected between the output terminal OUT and ground.

The step-down-side comparator CMP1 compares the input error signal S3 and first triangle wave signal S1. If the error signal S3 falls within the step-down-mode voltage range of the first triangle wave signal S1, the step-down-side comparator CMP1 outputs to the control circuit 17 a step-down-mode switch signal Ddn to cause the voltage step-up/down part 3 to function as a step-down circuit. The step-up-side comparator CMP2 compares the input error signal S3 and second triangle wave signal S2. If the error signal S3 falls within the step-up-mode voltage range of the second triangle wave signal S2, the step-up-side comparator CMP2 outputs to the control circuit 17 a step-up-mode switch signal Dup to cause the voltage step-up/down part 3 to function as a step-up circuit. The control circuit 17 generates a switching signal in response to the input step-down-mode switch signal Ddn and/or step-up-mode switch signal Dup, and outputs the switching signal to the predriver 18. The predriver 18 outputs the switching signal input from the control circuit 17 to the voltage step-up/down part 3 so that the voltage step-up/down part 3 performs step-up and step-down control.

Figure 3:
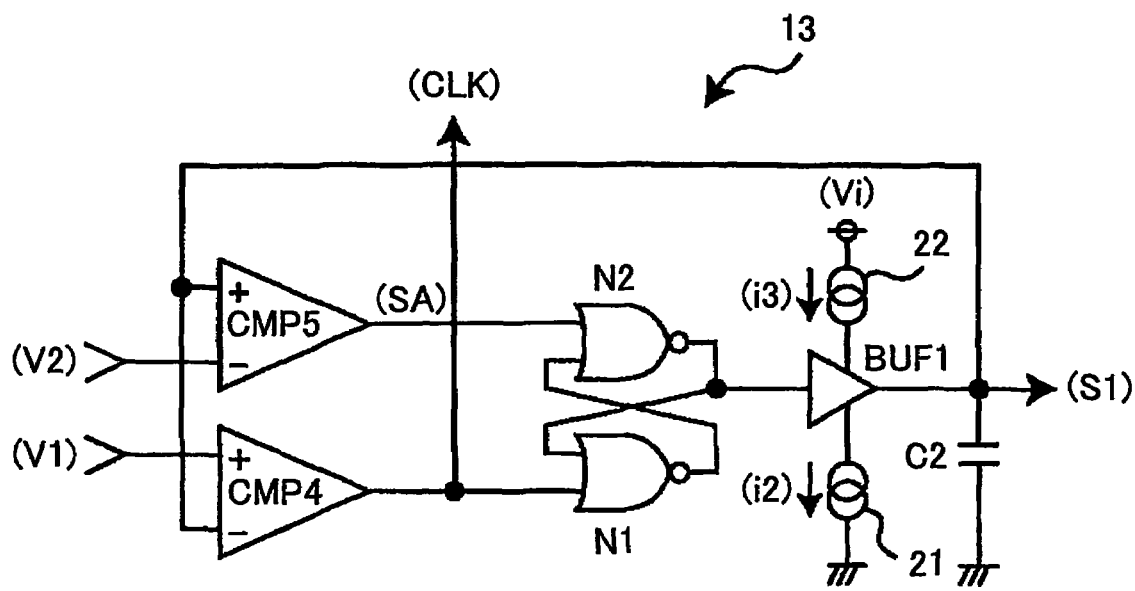
FIG. 3 is a circuit diagram showing a configuration of a first triangle wave generator circuit of FIG. 2 according to the embodiment of the present invention.

FIG. 3 is a circuit diagram showing a configuration of the first triangle wave generator circuit 13.

Referring to FIG. 3, the first triangle wave generator circuit 13 includes comparators CMP4 and CMP5, NOR circuits N1 and N2, a buffer circuit BUF1, a capacitor C2, and current sources 21 and 22.

The NOR circuits N1 and N2 form a latch circuit. One of the input terminals of the NOR circuit N2 is connected to the output terminal of the NOR circuit N1. One of the input terminals of the NOR circuit N1 is connected to the output terminal of the NOR circuit N2. The connection of the one of the input terminals of the NOR circuit N1 and the output terminal of the NOR circuit N2 forms the output terminal of the latch circuit, and is connected to the input terminal of the buffer circuit BUF1. The other one of the input terminals of the NOR circuit N1 is connected to the output terminal of the comparator CMP4. The clock signal CLK is output from the connection of the other one of the input terminals of the NOR circuit N1 and the output terminal of the comparator CMP4. The other one of the input terminals of the NOR circuit N2 is connected to the output terminal of the comparator CMP5.

The capacitor C2 is connected between the output terminal of the buffer circuit BUF1 and ground. The first triangle wave signal S1 is output from the connection of the output terminal of the buffer circuit BUF1 and the capacitor 2. The voltage V1 is input to the non-inverting input terminal of the comparator CMP4, and the first triangle wave signal S1 is input to the inverting input terminal of the CMP4. The voltage V2 is input to the inverting input terminal of the comparator CMP5, and the first triangle wave signal S1 is input to the non-inverting input terminal of the CMP5. The current source 22 is connected between the buffer circuit BUF1 and the input voltage Vi, and the current source 21 is connected between the buffer circuit BUF1 and ground. The buffer circuit BUF1 charges and discharges the capacitor C2. The charging and discharge currents are set by a current i3 supplied from the current source 22 and a current i2 supplied from the current source 21, respectively. The current i3 that charges the capacitor C2 and the current i2 that discharges the capacitor C2 are generated from the current i1 input to the first triangle wave generator circuit 13 from the current source 16.

When the voltage of the first triangle wave signal S1 becomes lower than or equal to the voltage V1, the level of the clock signal CLK, which is the output signal of the comparator CMP4, is switched to HIGH. The output signal of the comparator CMP4 is output to the corresponding input terminal of the NOR circuit N1. As a result, the level of the output terminal of the NOR circuit N1 is switched to LOW, and the level of the output terminal of the NOR circuit N2 is switched to HIGH. Accordingly, the output terminal of the buffer circuit BUF1 is switched to HIGH, so that the charging of the capacitor C2 is started to increase the voltage across the capacitor C2, thus increasing the voltage at the inverting input terminal of the comparator CMP4. As a result, the level of the clock signal CLK output from the comparator CMP4 returns to LOW. However, since the level of the output terminal of the NOR circuit N2 remains HIGH, the voltage across the capacitor C2 continues to increase.

Figure 4:
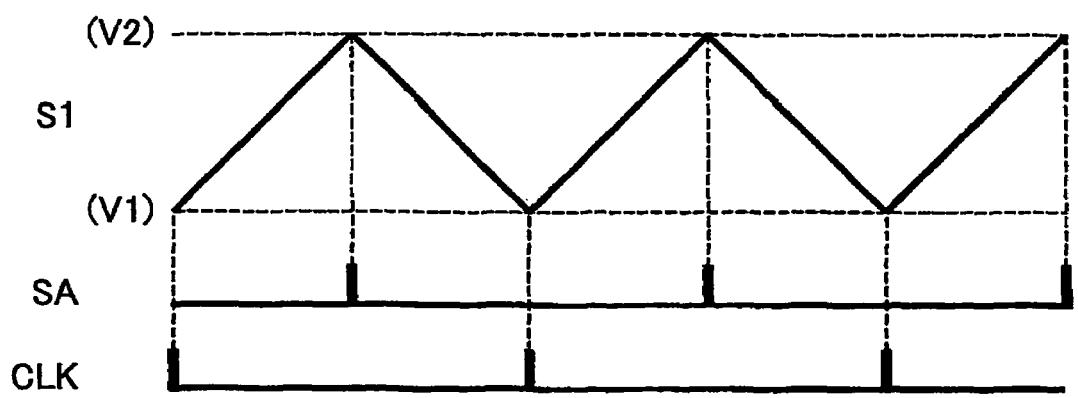
FIG. 4 is a timing chart of signals of the components of the first triangle wave generator circuit according to the embodiment of the present invention.

FIG. 4 is a timing chart of signals showing this operation.

Referring to FIG. 4, when the voltage of the first triangle wave signal S1 becomes higher than or equal to the voltage V2, the level of the output signal SA of the comparator CMP5 is switched to HIGH. The output signal SA is output to the corresponding input terminal of the NOR circuit N2 forming the latch circuit. As a result, the level of the output signal of the NOR circuit N2 is switched to LOW, and the level of the output signal of the NOR circuit N1 is switched to HIGH. The output signal of the NOR circuit N2 is output to the input terminal of the buffer circuit BUF1. Accordingly, the level of the output terminal of the buffer circuit BUF1 is switched to LOW, so that the capacitor C2 is discharged. As a result, the voltage across the capacitor C2 decreases to reduce the voltage at the non-inverting input terminal of the comparator CMP5. Consequently, the level of the output signal SA of the comparator CMP5 returns to LOW. On the other hand, since the level of the output terminal of the NOR circuit N2 remains LOW, the voltage across the capacitor C2 continues to decrease.

FIG. 4 shows that the first triangle wave signal S1 rises and falls between the voltages V1 and V2, and that the slope of voltage variation of the first triangle wave signal S1 forms triangle waves determined by the capacitance of the capacitor C2 and the currents i2 and i3. Further, since the output signal of the comparator CMP4 is employed as the clock signal CLK, the clock signal CLK can be generated in the first triangle wave generator circuit 13. Therefore, there is no need to add a new circuit for generating the clock signal CLK. As a result, the clock signal CLK can be generated without causing an increase in circuit space and cost.

Figure 5:
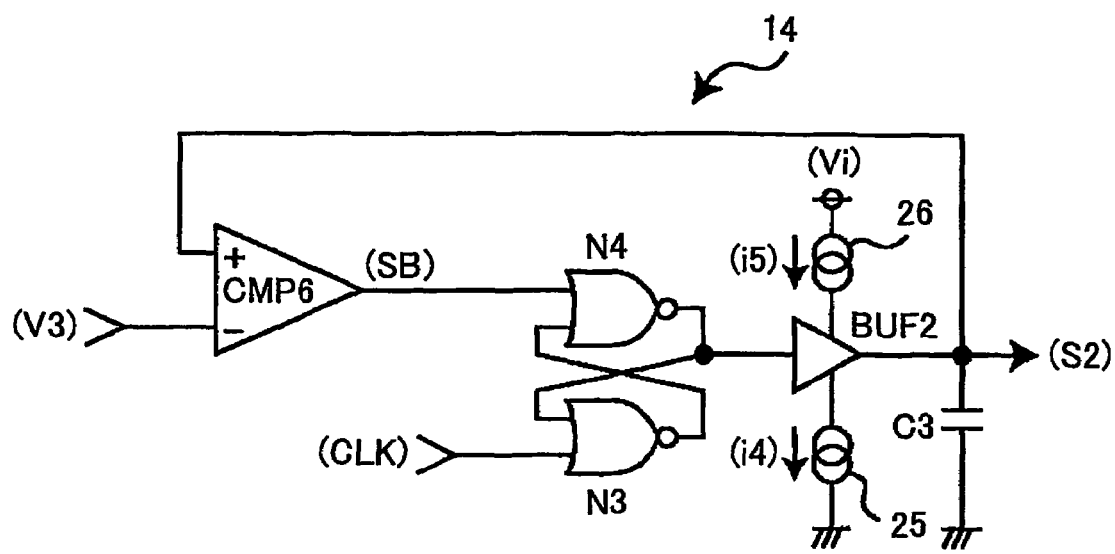
FIG. 5 is a circuit diagram showing a configuration of a second triangle wave generator circuit of FIG. 2 according to the embodiment of the present invention.

Next, FIG. 5 is a circuit diagram showing a configuration of the second triangle wave generator circuit 14.

The second triangle wave generator circuit 14 includes a comparator CMP6, a latch circuit formed by NOR circuits N3 and N4, a capacitor C3, a buffer circuit BUF2 charging and discharging the capacitor C3, current sources 25 and 26 setting the discharge current and the charging current, respectively, of the capacitor C3.

One of the input terminals of the NOR circuit N4 is connected to the output terminal of the NOR circuit N3. One of the input terminal of the NOR circuit N3 is connected to the output terminal of the NOR circuit N4. The connection of the one of the input terminal of the NOR circuit N3 and the output terminal of the NOR circuit N4 forms the output terminal of the latch circuit, and is connected to the input terminal of the buffer circuit BUF2. The clock signal CLK provided from the first triangle wave generator circuit 13 is input to the other one of the input terminals of the NOR circuit N3. The other one of the input terminals of the NOR circuit N4 is connected to the output terminal of the comparator CMP6.

The capacitor C3 is connected between the output terminal of the buffer circuit BUF2 and ground. The second triangle wave signal S2 is output from the connection of the capacitor C3 and the output terminal of the buffer circuit BUF2. The voltage V3 is input to the inverting input terminal of the comparator CMP6, and the second triangle wave signal S2 is input to the non-inverting input terminal of the comparator CMP6. The current source 26 is connected between the buffer circuit BUF2 and the input voltage Vi. The current source 25 is connected between the buffer circuit BUF2 and ground. The buffer circuit BUF2 charges and discharges the capacitor C3. The charging and discharge currents are set by a current i5 supplied from the current source 26 and a current i4 supplied from the current source 25, respectively. The current i5 that charges the capacitor C3 and the current i4 that discharges the capacitor C3 are generated from the current i1 input to the second triangle wave generator circuit 14 from the current source 16.

When the voltage of the second triangle wave signal S2 becomes higher than or equal to the voltage V3, the level of the output signal SB of the comparator CMP6 is switched to HIGH. The output signal SB is output to the corresponding input terminal of the NOR circuit N4 forming the latch circuit. As a result, the level of the output terminal of the NOR circuit N4 is switched to LOW, and the level of the output terminal of the NOR circuit N3 is switched to HIGH. Accordingly, the level of the output terminal of the buffer circuit BUF2 is switched to LOW, so that the discharging of the capacitor C3 is started to decrease the voltage across the capacitor C3, thus reducing the voltage at the non-inverting input terminal of the comparator CMP6. As a result, the level of the output signal SB of the comparator CMP6 returns to LOW. However, since the level of the output terminal of the NOR circuit N4 remains LOW, the voltage across the capacitor C3 continues to decrease.

On the other hand, the clock signal CLK output from the first triangle wave generator circuit 13 is input to the corresponding input terminal of the NOR circuit N3. Accordingly, when the level of the clock signal CLK is switched to HIGH, the level of the output terminal of the NOR circuit N3 is switched to LOW, and the level of the output terminal of the NOR circuit N4 is switched to HIGH. When the level of the output terminal of the NOR circuit N4 is switched to HIGH, the level of the output terminal of the buffer circuit BUF2 is switched to HIGH, so that the discharging of the capacitor C3 is switched to the charging thereof. As a result, the voltage across the capacitor C3 starts to increase. This operation is shown in the timing chart of signals of FIG. 6.

Figure 6:
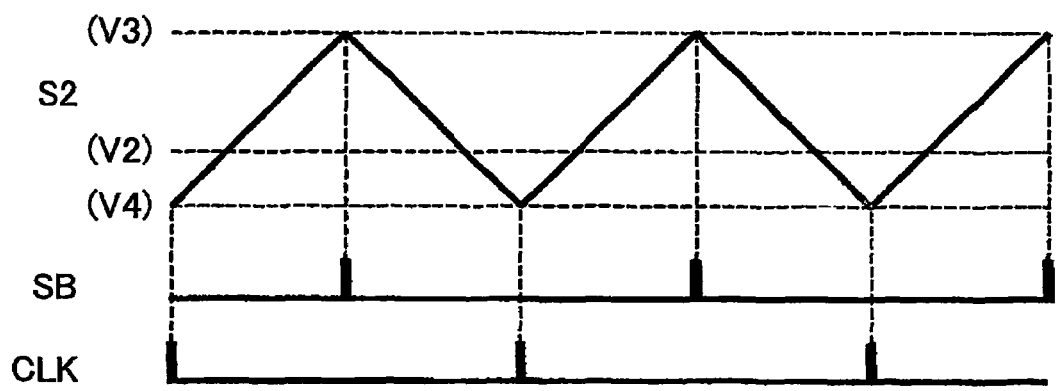
FIG. 6 is a timing chart of signals of the components of the second triangle wave generator circuit according to the embodiment of the present invention.

According to the voltage variation of the second triangle wave signal S2 shown in FIG. 6, the second triangle wave signal S2 rises and falls between the voltage V3 and a voltage V4, and the slope of voltage variation of the second triangle wave signal S2 forms triangle waves determined by the capacitance of the capacitor C3 and the currents i4 and i5. Further, the slope of voltage variation of the second triangle wave signal S2 is reversed at the lower limit voltage V4 by the clock signal CLK. That is, the voltage variation of the second triangle wave signal S2 is switched from falling to rising at the lower limit voltage V4 by the clock signal CLK. Accordingly, the second triangle wave signal S2 can be synchronized with the first triangle wave signal S1, and the comparator CMP4 for lower limit detection employed in the first triangle wave generator circuit 13 can be dispensed with. The slopes of voltage variation of the first triangle wave signal S1 and the second triangle wave signal S2 can be equalized with each other by setting the current i2 of the current source 21 of the first triangle wave generator circuit 13 and the current i4 of the current source 25 of the second triangle wave generator circuit 14 to the same current value, setting the current i3 of the current source 22 of the first triangle wave generator circuit 13 and the current i5 of the current source 26 of the second triangle wave generator circuit 14 to the same current value, and setting the capacitance of the capacitor C2 and the capacitance of the capacitor C3 to the same value.

Figure 7:
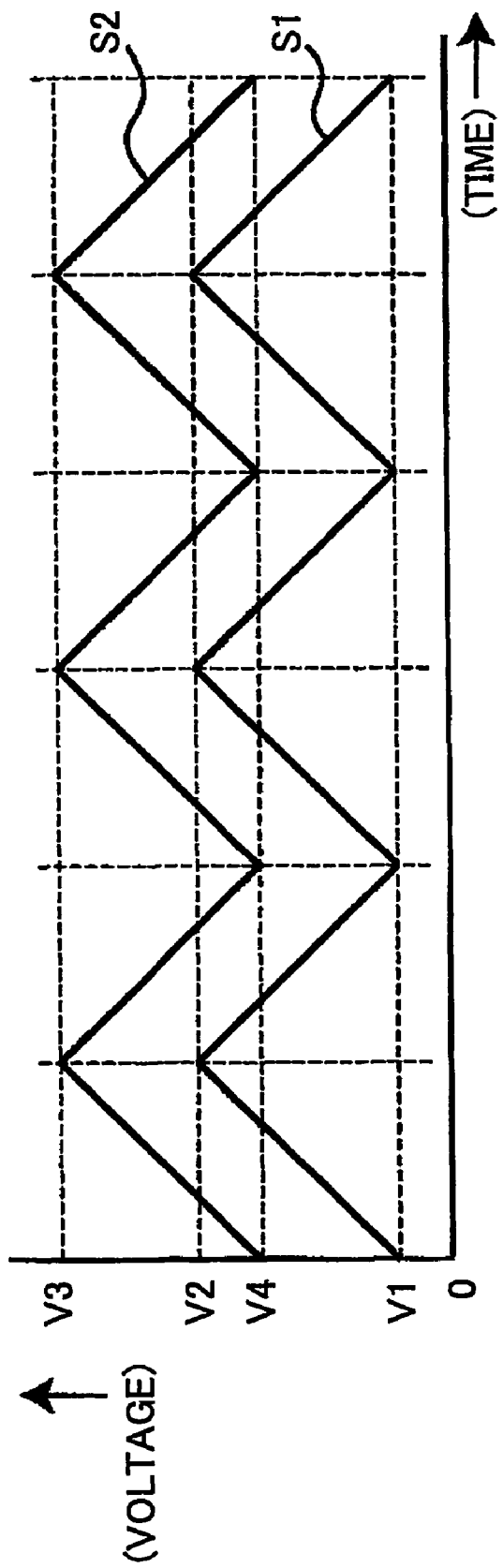
FIG. 7 is a graph showing the relationship between first and second triangle wave signals according to the embodiment of the present invention.

Next, FIG. 7 is a graph showing the relationship between the first and second triangle wave signals S1 and S2. FIG. 7 shows that the waveform of the second triangle wave signal S2 has the same slope of voltage variation as the waveform of the first triangle wave signal S1 and is shifted therefrom by a voltage (V3−V2). The lower limit voltage V4 of the second triangle wave signal S2 may be substantially expressed as follows:

$$V4=V3-(V2-V1).$$

When the relationship among the voltage V1 through V3 is set so that the voltages V1 through V3 satisfy V1<V2<V3 and (V2−V1)>(V3−V2), the lower limit voltage V4 falls between the voltages V1 and V2. The range from the lower limit voltage V4 and the voltage V2 defines a step-up/down area where both voltage step-up control and voltage step-down control are simultaneously performed on the voltage step-up/down part 3. If the step-up/down area does not exist, the output voltage Vo becomes unstable. On the other hand, if the voltage range of the step-up/down area is too wide, power supply efficiency decreases. Accordingly, the step-up/down area is set to such a voltage range as to stabilize the output voltage Vo and maximize power supply efficiency.

In the case of setting the voltages V1, V2, and V3 to 0.2 V, 0.8 V, and 1.2 V, respectively, for instance, the lower limit voltage V4 of the second triangle wave signal S2 is 0.6 V. The control circuit 17 causes the voltage step-up/down part 3 to perform a (voltage) step-down operation when the error signal S3 falls within the voltage range of 0.2 to 0.6 V (a step-down operation mode), a (voltage) step-up operation when the error signal S3 falls within the voltage range of 0.8 to 1.2 V (a step-up operation mode), and the (voltage) step-up and step-down operations when the error signal S3 falls within the voltage range of 0.6 to 0.8 V (a step-up/step-down operation mode).

The predriver 18 controls the switching of the PMOS transistor M1 and the NMOS transistors M2 through M4 in accordance with a control signal provided from the control circuit 17. The control circuit 17 performs step-up and step-down control on the voltage step-up/down part 3 via the predriver 18. In the case of causing the voltage step-up/down part 3 to perform the step-down operation, the control circuit 17 performs switching control by switching the NMOS transistor M3 OFF and the NMOS transistor M4 ON, outputting pulse signals to the gates of the PMOS transistor M1 and the NMOS transistor M2, and performing PWM control to control the duty cycle of each pulse signal. At this point, the control circuit 17 controls the PMOS transistor M1 and the NMOS transistor M2 so that the PMOS transistor M1 and the NMOS transistor M2 are not switched ON simultaneously.

In the case of causing the voltage step-up/down part 3 to perform the step-up operation, the control circuit 17 performs switching control by switching the PMOS transistor M1 ON and the NMOS transistor M2 OFF, outputting pulse signals to the gates of the NMOS transistors M3 and M4, and performing PWM control to control the duty cycle of each pulse signal. At this point, the control circuit 17 controls the NMOS transistor M3 and M4 so that the NMOS transistor M3 and M4 are not switched ON simultaneously.

Figure 8:
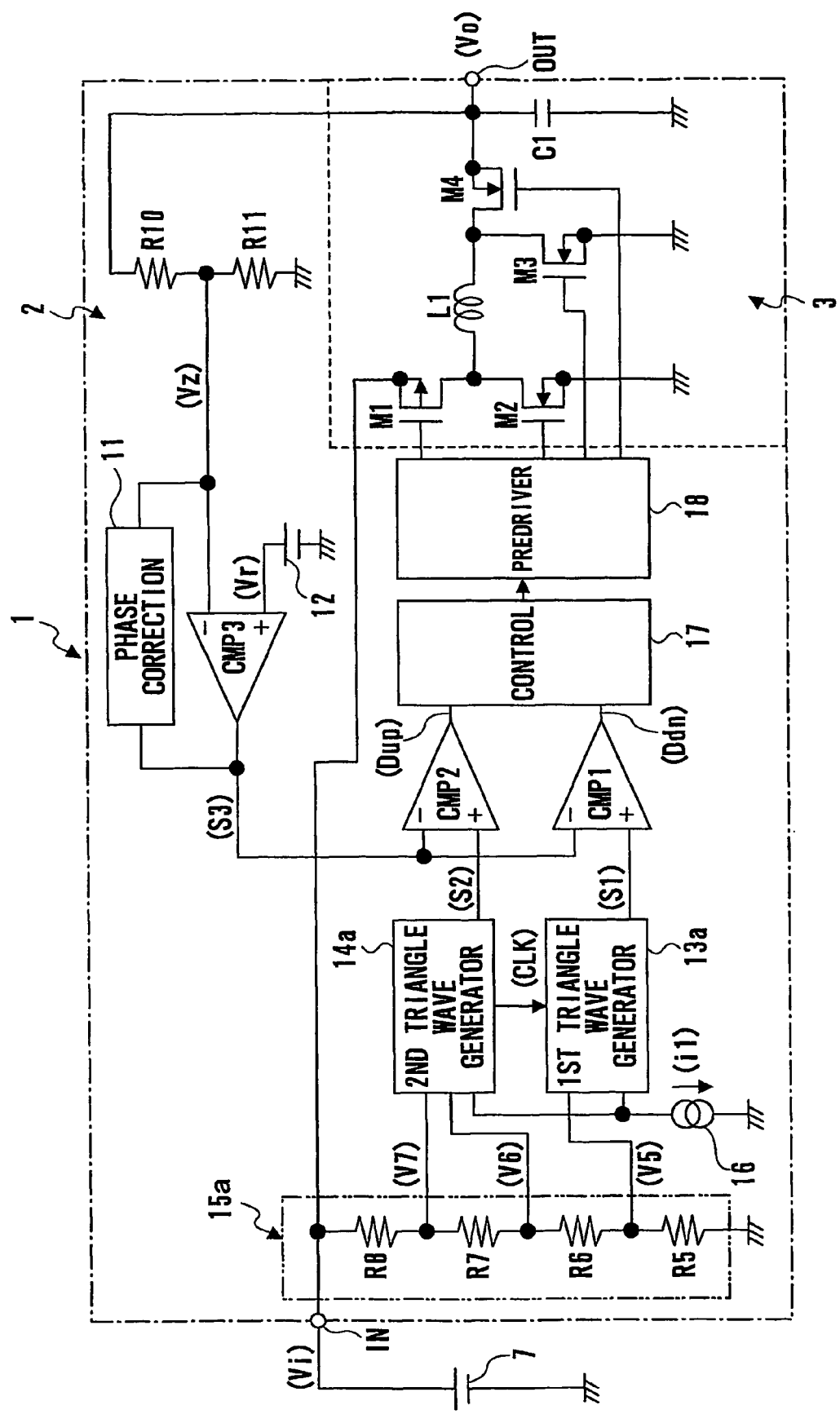
FIG. 8 is a circuit diagram showing another step-up/down DC-DC converter according to the embodiment of the present invention.

In the above description, the clock signal CLK is generated in the first triangle wave generator circuit 13 to be output to the second triangle wave generator circuit 14. Alternatively, the clock signal CLK may be generated in the second triangle wave generator circuit 14 to be output to the first triangle wave generator circuit 13. In this case, the step-up/down DC-DC converter 1 of FIG. 2 may have a configuration as shown in FIG. 8. FIG. 8 is a circuit diagram showing a step-up/down DC-DC converter 1a, which is a variation of the step-up/down DC-DC converter 1 according to this embodiment. In FIG. 8, the same elements as those of FIG. 2 are referred to by the same numerals and a description thereof is omitted. Only the difference from the DC-DC converter 1 of FIG. 2 is described below.

Referring to FIG. 8, the difference from the DC-DC converter 1 of FIG. 2 lies in that the clock signal CLK is generated in a second triangle wave generator circuit 14a generating the second triangle wave signal S2 for step-up control to be output to a first triangle wave generator circuit 13a generating the first triangle wave signal S1 for step-down control, and that voltages V5, V6, and V7 are generated in a voltage setting circuit 15a. In FIG. 8, the first triangle wave generator circuit 13a, the second triangle wave generator circuit 14a, the voltage setting circuit 15a, and a PWM control part 2a correspond to the first triangle wave generator circuit 13, the second triangle wave generator circuit 14, the voltage setting circuit 15, and the PWM control part 2, respectively, of FIG. 2.

Referring to FIG. 8, the voltage setting circuit 15a is formed by resistors R5, R6, R7, and R8 connected in series between the input terminal IN and ground. The voltage at the connection of the resistors R5 and R6 is the voltage V5. The voltage at the connection of the resistors R6 and R7 is the voltage V6. The voltage at the connection of the resistors R7 and R8 is the voltage V7. The voltages V6 and V7 for setting the lower limit voltage and the upper limit voltage, respectively, of the second triangle wave signal S2 are input to the second triangle wave generator circuit 14a. The voltage V5 for setting the lower limit voltage of the first triangle wave signal S1 is input to the first triangle wave generator circuit 13a. The upper limit voltage of the first triangle wave signal S1 is determined by the clock signal CLK input to the first triangle wave generator circuit 13a from the second triangle wave generator circuit 14a. The voltages V5 through V7 are set so as to satisfy V5<V6<V7 and (V6−V5)<(V7−V6). The voltage V5 forms the first voltage Va, the voltage V6 forms the second voltage Vb, and the voltage V7 forms the third voltage Vc.

The first triangle wave generator circuit 13a has a circuit configuration formed by removing the comparator CMP 5 from the circuit configuration of FIG. 3. The voltage V5 is input to the non-inverting output terminal of the comparator CMP4 instead of the voltage V1. Further, the clock signal CLK is input from the second triangle wave generator circuit 14a to the input terminal of the NOR circuit N2 made open by the removal of the comparator CMP5.

The second triangle wave generator circuit 14a has a circuit configuration formed by adding a comparator CMP7 to the circuit configuration of FIG. 5. The output terminal of the comparator CMP7 is connected to the input terminal of the NOR circuit N3 to which the clock signal CLK has been input. The second triangle wave signal S2 is input to the non-inverting input terminal of the comparator CMP7, and the voltage V6 is input to the inverting input terminal of the comparator CMP7. Further, the voltage V7 is input to the inverting input terminal of the comparator CMP6 instead of the voltage V3. The output signal of the comparator CMP6 forms the clock signal CLK, and is output to the first triangle wave generator circuit 13a.

Thus, according to the step-up/down DC-DC converter 1 (1a) of this embodiment, the clock signal CLK for synchronizing the first triangle wave signal S1 for step-down control of the output voltage Vo and the second triangle wave signal S2 for step-up control of the output voltage Vo may be generated in one of the first and second triangle wave generator circuits 13 (13a) and 14 (14a) to be employed in generating the triangle wave signal in the other one of the first and second triangle wave generator circuits 13 (13a) and 14 (14a). This eliminates the necessity of providing an additional circuit for generating the clock signal CLK, thus realizing circuit simplification and cost reduction.

The present invention is not limited to the specifically disclosed embodiment, and variations and modifications may be made without departing from the scope of the present invention. The present application is based on Japanese priority patent application No. 2003-123820, filed on Apr. 28, 2003, the entire contents of which are hereby incorporated by reference.

The invention claimed is:

1. A step-up/down DC-DC converter, comprising:

a voltage step-up/down part configured to generate and output a predetermined output voltage by stepping up or down an input voltage in accordance with a control signal input to the voltage step-up/down part; and a control part configured to generate an error signal indicating an error between a voltage value obtained by dividing the output voltage and a predetermined reference voltage, compare the error signal and first and second triangle wave signals, and cause the voltage step-up/down part to perform a step-up or step-down operation based on a result of the comparison, wherein the control part includes:

a first triangle wave generator circuit configured to generate the first triangle wave signal compared with the error signal to determine whether to cause the voltage step-up/down part to perform the step-down operation;

a second triangle wave generator circuit configured to generate the second triangle wave signal compared with the error signal to determine whether to cause the voltage step-up/down part to perform the step-up operation;

a first voltage generator circuit configured to generate and output a first voltage Va for setting a lower limit voltage of the first triangle wave signal;

a second voltage generator circuit configured to generate and output a second voltage Vb for setting an upper limit voltage of the first triangle wave signal;

a third voltage generator circuit configured to generate and output a third voltage Vc for setting an upper limit voltage of the second triangle wave signal; and a current generator circuit configured to generate and output a current setting a slope of voltage variation of each of the first and second triangle wave signals, wherein the first triangle wave generator circuit is configured to generate a clock signal synchronized with the generated first triangle wave signal, and output the generated clock signal to the second triangle wave generator circuit, the second triangle wave generator circuit is configured to generate the second triangle wave signal synchronized with the first triangle wave signal based on the input clock signal, and output the second triangle wave signal, the first triangle wave generator circuit is configured to generate the first triangle wave signal from the first and second voltages Va and Vb and the current output from the current generator circuit, and the second triangle wave generator circuit is configured to generate the second triangle wave-signal from the third voltage Vc, the current output from the current generator circuit, and the clock signal output from the first triangle wave generator circuit.

2. The step-up/down DC-DC converter as claimed in claim 1, wherein the first, second, and third voltage generator circuits are configured to generate and output the corresponding first, second, and third voltages Va, Vb, and Vc so that the first, second, and third voltages Va, Vb, and Vc satisfy Va<Vb<Vc and (Vb−Va)>(Vc−Vb).

3. The step-up/down DC-DC converter as claimed in claim 1, wherein the second triangle wave generator circuit is configured to decrease a voltage of the second triangle wave signal when the voltage of the second triangle wave signal reaches the third voltage Vc, and increase the voltage of the second triangle wave signal in synchronization with the clock signal.

4. The step-up/down DC-DC converter as claimed in claim 1, wherein each of the first, second, and third voltage generator circuits is configured to generate a corresponding one of the first, second, and third voltages Va, Vb, and Vc by dividing a predetermined voltage by resistors.

5. A step-up/down DC-DC converter, comprising:

a voltage step-up/down part configured to generate and output a predetermined output voltage by stepping up or down an input voltage in accordance with a control signal input to the voltage step-up/down part; and a control part configured to generate an error signal indicating an error between a voltage value obtained by dividing the output voltage and a predetermined reference voltage, compare the error signal and first and second triangle wave signals, and cause the voltage step-up/down part to perform a step-up or step-down operation based on a result of the comparison, wherein the control part includes:

a first triangle wave generator circuit configured to generate the first triangle wave signal compared with the error signal to determine whether to cause the voltage step-up/down part to perform the step-down operation;

a second triangle wave generator circuit configured to generate the second triangle wave signal compared with the error signal to determine whether to cause the voltage step-up/down part to perform the step-up operation;

a first voltage generator circuit configured to generate and output a first voltage Va for setting a lower limit voltage of the first triangle wave signal;

a second voltage generator circuit configured to generate and output a second voltage Vb for setting a lower limit voltage of the second triangle wave signal;

a third voltage generator circuit configured to generate and output a third voltage Vc for setting an upper limit voltage of the second triangle wave signal; and a current generator circuit configured to generate and output a current setting a slope of voltage variation of each of the first and second triangle wave signals, wherein the second triangle wave generator circuit is configured to generate a clock signal synchronized with the generated second triangle wave signal, and output the generated clock signal to the first triangle wave generator circuit, the first triangle wave generator circuit is configured to generate the first triangle wave signal synchronized with the second triangle wave signal based on the input clock signal, and output the first triangle wave signal, the first triangle wave generator circuit is configured to generate the first triangle wave signal from the first voltage Va, the current output from the current generator circuit, and the clock signal output from the second triangle wave generator circuit, and the second triangle wave generator circuit is configured to generate the second triangle wave signal from the second and third voltages Vb and Vc and the current output from the current generator circuit.

6. The step-up/down DC-DC converter as claimed in claim 5, wherein the first, second, and third voltage generator circuits are configured to generate and output the corresponding first, second, and third voltages Va, Vb, and Vc so that the first, second, and third voltages Va, Vb, and Vc satisfy Va<Vb<Vc and (Vb−Va)<(Vc−Vb).

7. The step-up/down DC-DC converter as claimed in claim 5, wherein the first triangle wave generator circuit is configured to increase a voltage of the first triangle wave signal when the voltage of the first triangle wave signal reaches the first voltage Va, and decrease the voltage of the first triangle wave signal in synchronization with the clock signal.

8. The step-up/down DC-DC converter as claimed in claim 5, wherein each of the first, second, and third voltage generator circuits is configured to generate a corresponding one of the first, second, and third voltages Va, Vb, and Vc by dividing a predetermined voltage by resistors.

* * * * *